July 29, 1958  C. E. LINKOUS  2,845,549
ALTERNATING CURRENT MOTOR
Filed April 19, 1956  3 Sheets-Sheet 1

Inventor:
Clovis E. Linkous,
by
His Attorney.

July 29, 1958 C. E. LINKOUS 2,845,549
ALTERNATING CURRENT MOTOR
Filed April 19, 1956 3 Sheets-Sheet 2
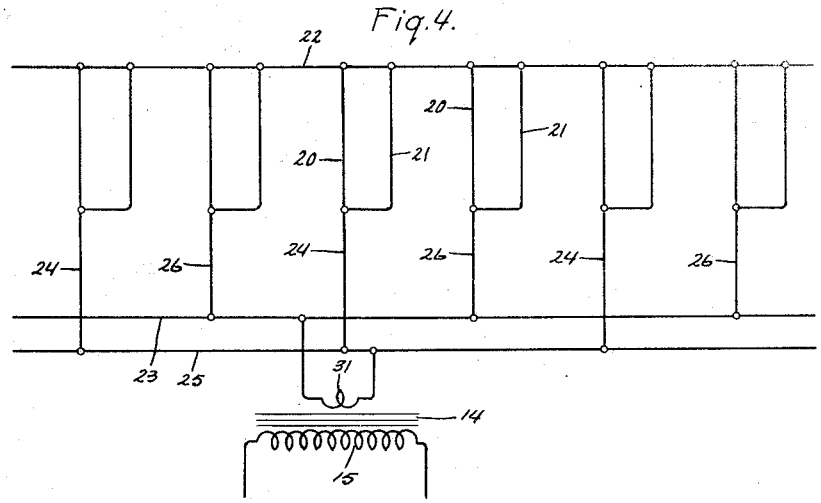
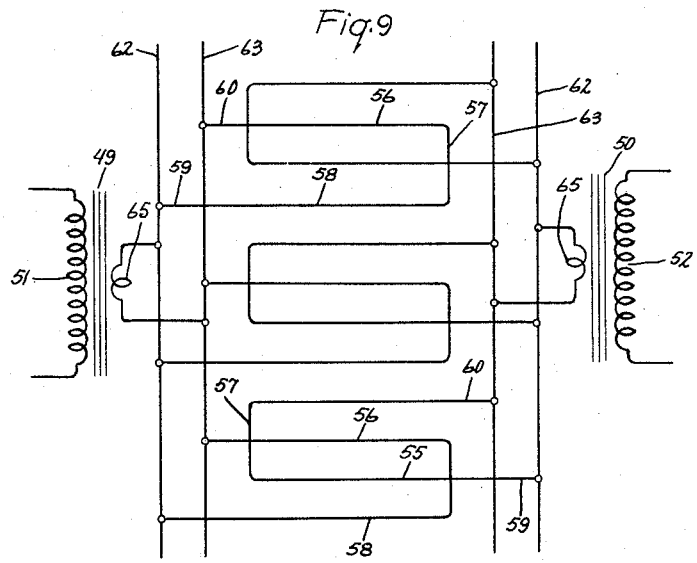
Inventor:
Clovis E. Linkous,
by Robert G. Friel
His Attorney.

July 29, 1958     C. E. LINKOUS     2,845,549
ALTERNATING CURRENT MOTOR
Filed April 19, 1956     3 Sheets-Sheet 3
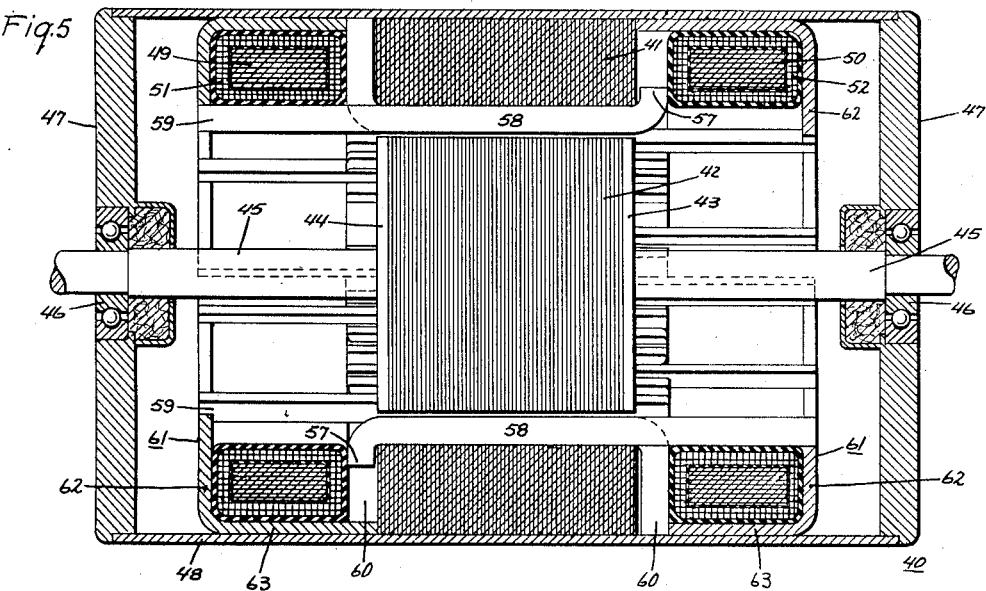
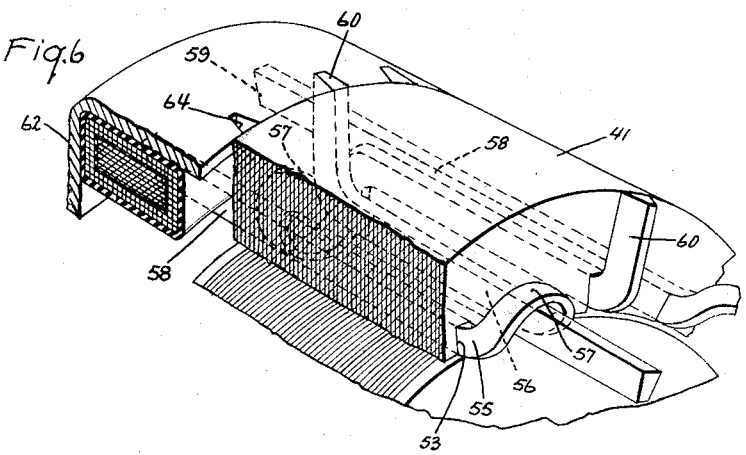
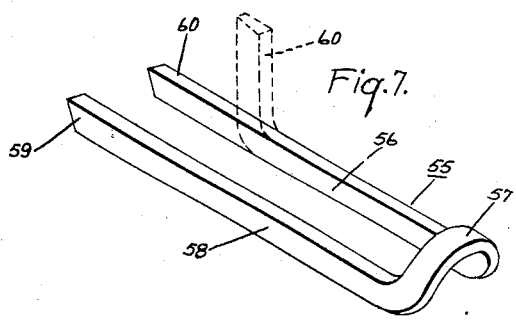
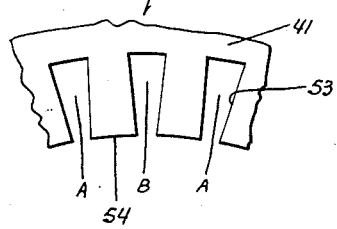
Inventor:
Clovis E. Linkous,
by
His Attorney.

United States Patent Office 2,845,549
Patented July 29, 1958

2,845,549

ALTERNATING CURRENT MOTOR

Clovis E. Linkous, Fort Wayne, Ind., assignor to General Electric Company, a corporation of New York Application April 19, 1956, Serial No. 579,315

16 Claims. (Cl. 310—68)

This invention relates to dynamoelectric machines, and more particularly to alternating current motors of the type where one of the motor core members has a winding connected across the secondary coil of a transformer.

In the design of alternating current motors, it is important to obtain the highest possible motor output for a given length of core stacking and a given motor diameter. In an induction-type motor, for instance, the output varies in a predetermined proportional relationship with the diameter of the secondary or rotor member. This diameter is, in turn, limited for a given motor diameter by the depth of slot necessary in the stator member to receive the flux inducing winding. From this it will be clear that the greater the effective use of the stator slots, the smaller the slots can be and therefore the larger the rotor diameter can be for a predetermined amount of conductor in each slot of the stator. Effective utilization of slot space is equally important in other types of alternating current motors. It is, therefore, most desirable to provide an alternating current motor having optimum slot space utilization.

Another feature in the production of electric motors which constitutes a desirable goal is the elimination to as great an extent as possible of the plurality of different parts which go to make up a motor, and the replacement of the different parts by one or few parts which will achieve the same end at less expense.

Yet another important goal, particularly in the field of very small motors and motors having very high numbers of poles, is the provision of a winding in the simplest and most economical manner. In the case of such motors, it is usually very difficult to position the windings in the slots as desired, because machines in common use today for winding coils are not normally small enough or precise enough to achieve the desired end, and hand winding in such instances is exceedingly costly.

It is, therefore, an object of this invention to provide an improved alternating current motor which will incorporate structure making possible the desirable features set forth above.

In one aspect, the invention provides an electric motor which has two coaxial relatively rotatable members. A toroidal transformer core member is arranged to be axially adjacent to and substantially coaxial with the relatively rotatable members. The transformer core member is provided in the usual manner with a primary coil which is arranged in flux inducing relation to the core member and with a secondary coil to which the core member is in voltage inducing relation. A winding is positioned on one of the two relatively rotatable members and is electrically connected across at least a part of the secondary coil.

The secondary coil of the transformer may advantageously be made up of either one or a small number of turns so that a very low voltage motor is provided. This eliminates to a considerable extent many of the insulation problems present in ordinary motors. Another advantage that can be obtained from such a construction is that the motor winding connected across the secondary can be made integral therewith, and, indeed, can be formed as a casting so as to fill the core slot entirely.

The physical position of the transformer relative to the motor members makes the magnetic coupling between the transformer and the motor very high so that there is very little leakage reactance which can occur. Yet another advantage obtainable is that the secondary coil of the transformer, in addition to being formed integral with the winding in the motor by casting, can also be formed (by the use of suitable inserts during the casting process) to provide a casing, an end shield, and a bearing hub for the motor thereby eliminating a considerable number of parts which previously had to be supplied independently. Another feature which becomes particularly attractive, as discussed above, in the case of motors having exceedingly small bores and motors having high numbers of poles is the fact that the low voltage high current secondary circuit of the transformer makes possible the use of a winding consisting of a single bar extending through the slots of the motor core member so that the use of wire and the difficulties encountered therewith are completely avoided.

The features of the invention which are believed to be novel are set forth with particularity in the appended claims. The invention itself, however, both as to its organization and method of operation, together with further objects and advantages thereof, may best be understood by reference to the following description taken in connection with the accompanying drawings.

In the drawings,

Figure 4 is a schematic diagram of the electrical circuit of the apparatus of Figures 1 to 3;

Figure 5 is a view in cross section of a different type of motor utilizing a modified arrangement of the invention;

Figure 6 is a fragmentary view in perspective, partly in cross section, of a portion of the motor shown in Figure 5;

Figure 7 is a view in perspective of one of the elements used in the improved motor of Figures 5 and 6;

Figure 8 is a fragmentary end view of the stator member of the motor of Figures 5 and 6; and Figure 9 is a schematic view of the electrical circuitry of the motor of Figures 5 to 8.

Figure 1:
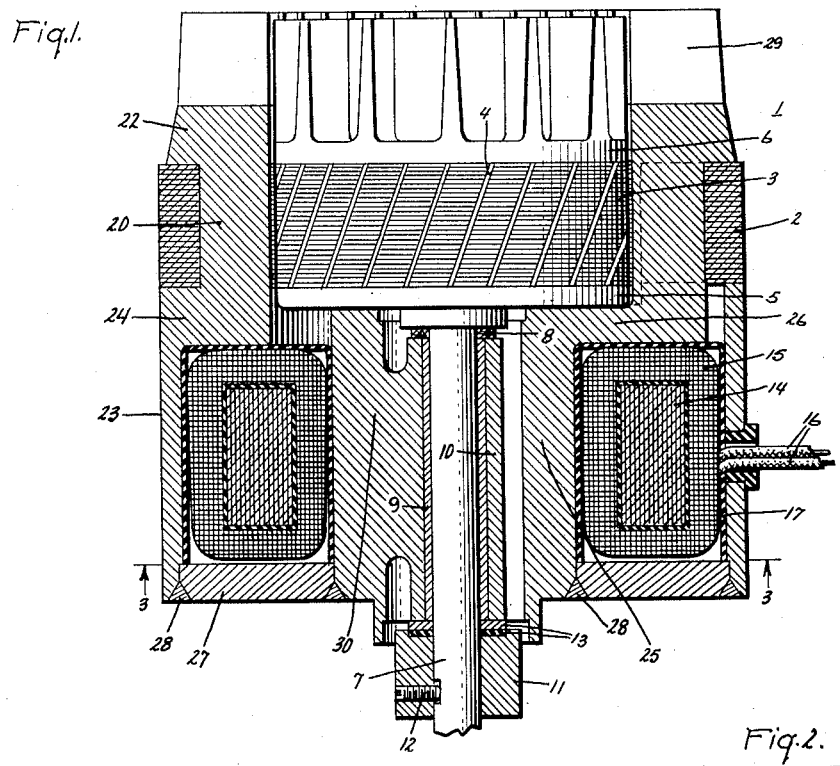
Figure 1 is a view in cross section of an improved self-starting induction-type motor utilizing the advantageous construction of the invention.

Referring now to Figures 1, 2, 3, and 4 of the drawings, there is shown a single-phase induction motor, generally indicated at 1, having a pair of coaxial core members consisting of a stationary core member 2 and a rotatable core member 3 concentric therewith, both made up in the usual manner of a stacked plurality of thin laminations of magnetic material. Rotor member 3 has a standard squirrel cage type winding formed therein with conductive material arranged in substantially axially extending slots 4, all of the material in the slots 4 being joined together at each end by end rings 5 and 6. Rotor 3 is mounted on a shaft 7 provided with a thrust washer 8 secured thereto. Shaft 7 is supported within insert 9 of a bearing, generally shown at 10, which will be further described herebelow. A part 11 may be secured to the shaft by a threaded member 12 with washers 13 secured thereto as shown. Washer 8 and washers 13 are arranged to abut against the ends of bearing 10 so as to act as thrust bearing surfaces for rotor member 3 and to determine the coaxial position of the rotor member with core member 2.

A transformer magnetic core member 14 normally made up of a plurality of thin superimposed layers of magnetic material as shown, is provided with a toroidal form and is positioned axially adjacent to members 2 and 3 and substantially coaxial with those members. A primary coil, made up of a relatively high number of turns of wire, 15 is arranged about core 14 in the usual flux-inducing manner so that when current is supplied to the coil 15 from a single-phase alternating-current source of power (not shown) by means of leads such as 16, fluxes will be set up in the core member 14. Since the primary coil 15 will have the line voltage across it, it is generally deemed desirable to surround it with suitable insulation such as that shown at 17.

Returning now to the stationary motor member 2, this member is provided with a plurality of axially extending slots 18 of relatively large cross section and an equal number of slots 19 of relatively small cross section. It will be observed that six slots of each variety are provided; as will appear more clearly below, the number of large slots determines the number of poles of the motor 1. Conductive material is arranged to fill each of the slots, as shown at 20 in connection with large slots 18 and at 21 (see Figure 2 in particular) in connection with small slots 19. All of these conductors are joined together at their end remote from the core member 14 by a member in the nature of an end ring indicated at 22 which may, if desired, be provided with fins 29 for heat dissipation purposes. At that end of core member 2 which is adjacent transformer core 14, conductors 20 and 21 are connected either to an outer shell-like member of conductive non-magnetic material 23 by joining portion 24 or to an inner (relative to core 14) section 25 by a joining portion 26. Outer annular section 23 and inner annular section 25 are joined together by electrically conductive non-magnetic portion 27 which may be secured to sections 23 and 25 by any desired means such as, for instance, brazing as shown at 28. In addition, it will be seen that bearing 10 may be formed integral with and supported by inner section 25 by interconnecting spider sections 30, as shown.

Figure 2:
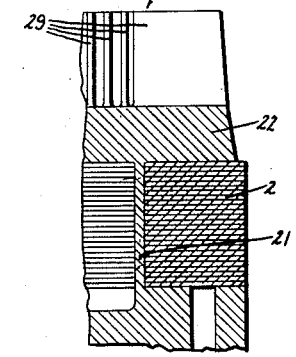
Figure 2 is a fragmentary partly cross sectional view of a portion of the stator of the motor of Figure 1.
Figure 3:
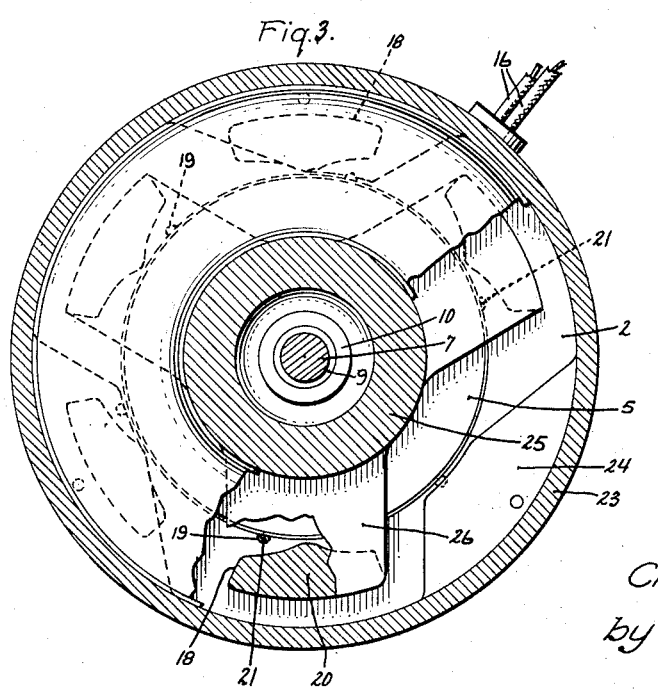
Figure 3 is a view along line 3—3 in Figure 1.

It will be seen from the foregoing description and from an examination of Figures 1, 2, and 3 that end ring-like member 22, conductors 20 and 21, joining portions 24 and 26, outer shell member 23, inner section 25, and bearing 10 may all be formed together as a single integral part in a single casting operation. This is made possible by the physical arrangement of the transformer core member 14 with respect to the motor core members 2 and 3. Thus, the motor is provided with shell 23 and bearing 10 in the same operation which provides the windings which are formed in the slots 18 and 19 and which will be further described herebelow. Since, previously, the formation of these three elements were of necessity three separate and entirely unrelated operations, it will be seen that an arrangement whereby they may be integrated in the manner shown, is one which provides considerable economy. In addition, it can be seen that the casting of the conductors in the slots provides maximum utilization of the space within the slots thereby permitting smaller slots for a given cross sectional area of conductor therein and, consequently, a larger rotor member 2. Yet another feature is the fact that conductors 20 and 21, member 22, and joining portions 24 and 26 act to clamp the laminations of core 2 and may be so utilized to the exclusion of other clamping means.

Referring now to Figures 1 and 4, the manner in which the physical structure which has just been described provides a desirable electrical alternating current motor circuit will be described. Sections 23, 25 and 27, form a single-turn secondary coil, as shown at 31 in Figure 4. Also, joining portions 24 and 26, together with the pairs of conductors 20 and 21 and the end ring member 22 form six closed circuits for the single-turn secondary coil 31. With this arrangement, all joining portions 26 conduct in the same direction and all joining portions 24 conduct in the opposite direction. In this manner, any pair of conductors 20 and 21 will have a current flow in the opposite direction to the two adjacent pairs, thus forming alternating north and south poles.

Summarizing the structure briefly, the cast parts 20, 21, 22, 23, 24, 25 and 26, together with additional section 27, form the six poles of the stator member of an induction motor all connected in parallel, and also form a single-turn secondary coil for a transformer with each pole being connected across the single turn. This, in addition to the previously mentioned advantages, provides an exceedingly low voltage arrangement which decreases to the point of elimination the insulation necessary between the core member 2 and the conductive material in the slots 18 and 19, and also utilizes the space within the slots to as great an extent as possible. In addition, the fact that the secondary turn 31 is connected to the motor conductors 20 and 21 by short wide portions 24 and 26 makes for an excellent magnetic coupling between the secondary coils and the motor windings.

Referring now to the conductive material 21 in slot 19, it will be seen, particularly by reference to Figure 3, that slot 19 has a cross sectional area a great deal smaller than slot 18. In addition, slot 19 may be formed open at the bore of stator core 2 while slot 18 may be formed as a substantially closed member, as shown. The different positions and shapes of the two slots 18 and 19 cause slots 18 to have relatively low resistance and relatively high reactance with the opposite being true in both cases for slot 19. In effect, the material in slot 19 has the effect of a shading coil in that it constitutes a winding displaced in space and phase from the main pole winding in slot 18. Thus, motor 1 is made self-starting by the provision of conductors 21 in slots 19. It will be observed that this starting arrangement is provided in the same operation as all the remainder of the parts discussed above. An additional advantage which is obtained from the particular construction lies in the fact that, as can best be seen in Figure 4, each shading coil conductor 21 is actually connected electrically across each main pole conductor 20. This, in effect, causes the current flowing through conductor 20 to constitute the difference between the current supplied and the current in shading coil conductor 21, as opposed to the conventional type of shaded pole motor, where the currents in the main winding and in the shaded coil flow in total. The smaller current in conductor 20 can be used by the designer either to provide a lower current density in the slot and thus improve the efficiency, or to make possible a smaller slot with normal current density and increase the flux capacity of the motor, thus increasing the maximum output.

Referring now to Figures 5 to 9 of the drawings, a second embodiment of the invention provided for a different application will be described. A two-phase servomotor, generally indicated at 40, adapted for use with a high frequency source of power, is provided with a stationary core member 41 and a rotatable core member 42 in concentrically coaxial relation. Member 42 has a plurality of conductors extending axially thereacross (not shown since the conductors are in closed slots), the conductors all being joined together at each end by end rings 43 and 44 so as to form a squirrel cage winding in the standard manner. Rotor member 42 is mounted on a shaft 45 which is rotatably secured at its ends within ball bearings 46 held in end shield members 47 which, together with cylindrical shell 48, form an enclosure for the motor 40. A pair of toroidal transformer core members of magnetic material numbered respectively 49 and 50 are arranged at the end of core members 41 and 42. The core members are provided with primary coils 51 and 52 respectively arranged on the cores in the usual flux-inducing manner and adapted to be energized respectively by the two phases of a two-phase source of alternating-current power.

Referring now again to the stator core member 41, it is provided with a plurality of slots 53 preferably having a wedge shape such as seen in Figure 8, with the small end of the wedge at the bore 54 of the stator. A substantially U-shaped member 55 of conductive material, best seen in Figure 7, has in its original form two straight portions 56 and 58 joined at one end by a bight 57 in the shape of bent over-portion. It will further be observed that the cross section of member 55 is substantially wedge shaped to correspond to the shape of slots 53. Each of the straight portions 56 and 58 is arranged within one of the slots 53, with one slot left between the slots respectively receiving portions 56 and 58, as shown best in Figure 6. Each member 55 may be speedily and simply inserted in the appropriate slots 53 by simply sliding it in from one end until axial movement is stopped by engagement of bight 57 against the core member. After the member 55 is in this position, the end 60 of portion 56 is bent upwardly, as shown in dotted outline in Figure 7 and as also shown in solid outline in Figures 5 and 6. The other straight portion 58 of member 55 extends axially, as shown at 59, beyond core member 41 and beneath that one of transformer cores 49 and 50 with which it is associated.

Viewing Figure 5 in particular, members 55 are divided into two oppositely axially positioned groups, the first having their bights 57 at the right end of core 41 and their end portions 59 and 60 extending along two respective sides of transformer core member 49; and the second having their bights 57 at the left end of core member 41 and their end portions 59 and 60 extending along respective sides of the transformer core member 50. Thus, referring to Figure 8, the two slots marked A would respectively receive portions 56 and 58 of a member 55 of one group, and slot B would receive a portion of a member 55 of the other group. It will be observed that with the preferred wedge shape of members 55 and of slots 53, the members, when positioned in the slots by sliding them in from the end and after portions 60 have been properly shaped, will be locked against axial movement by loop 57 and portion 60 and against radial movement by the mating wedge shapes of the slot and the member.

An annular member 61 of conductive material, having a radially extending part 62 and an axially extending part 63 respectively arranged around the axially and radially outer sides of transformer core 49 is positioned so that part 62 is in electrical contact with the end of each end portion 59 and part 63 is in electrical contact with the outer end of each portion 60. The same arrangement is provided in connection with transformer core 50 at the other end of motor core member 41, as shown. As can be seen in Figure 6, part 63 of member 61 may be provided with recesses 64 at its edge to accommodate the ends of portions 60.

Referring now to Figures 5, 6 and 9 together, it will be seen that the parts 62 and 63 of each member 61, together with the portions 59 and 60 cooperating therewith, form two single-turn secondary coils 65 about transformer cores 49 and 50 respectively. Each member 55 acts as a pole having the same polarity as every other member 55 which is similarly arranged, that is, which has its bight 57 at the same end of core 41. Also, it will be seen that all of the same poles are connected in parallel across a single secondary loop 65 so that there will be an exceedingly low voltage across the coil together with a relatively high current. It will further be seen that the arrangement whereby all the windings for each one phase are connected to have the same polarity will create consequent poles between them, so that the number of poles for each phase will actually be twice the number of members 55 connected across the secondary winding of the transformer receiving power from that phase.

The motor 40 set forth in Figures 5 to 9 is, as explained above, a two phase high frequency type servomotor; thus, a high number of poles are necessary to reduce the speed of rotation to one which can be used with standard types of bearing and other structures. The fact that such motors are generally very small (often one or two inches in length and as small as 1.5 inches in outside diameter), and the fact that the slots themselves must be quite small comparative to the motor because so many of them are required in order to form an adequate number of poles, means that the winding of wire within the slots would be an extremely difficult process. It is for this reason that the transformer and motor construction set forth, which permits the use of a single member which may be slipped into the slot to act as a winding, is of such value and importance. It will be observed in this case that the windings of the motor are not cast as in the embodiment of Figures 1 to 4 and that the invention has advantageous features whether the conductors be cast or inserted as individual members such as 55, the advantages obtained varying with the type of structure used. It will also be understood, particularly with reference to the embodiment of Figures 5 to 9, that separate and additional housing and bearing members have been provided so that the advantageous feature of the motor windings themselves might more clearly be brought out, but that, where it is desired, the transformer secondary member may be formed to provide the bearing structure as well and that the housing structure may be substantially omitted.

It will further be understood that, while the invention has been illustrated by two specific types of motors, that is, a single phase shaded pole type motor and a two phase high frequency servomotor, the invention is susceptible of other applications where it can provide many of the advantageous features set forth either in the first embodiment of Figures 1 to 4 or the second embodiment of Figures 5 to 9. It will further be understood that, while the invention has been shown as applying to motors having all the windings of one phase in parallel, this has been done since such an arrangement is the simplest for purposes of illustration and that other winding arrangements are possible. Along the same line of thought, only one single integral conductor has been arranged in each slot in the embodiments discussed but again it will be obvious that other arrangements may be provided particularly where individual conductors are inserted as in the case of the second embodiment rather than case conductors as in the case of the first embodiment. Also, the invention is not to be deemed limited to induction-type motors, which have been described because of the relatively greater simplicity thereof than other types of motors for illustrative purposes. The only limitation of this type is that the transformer must receive alternating current to be effective and thus the motor must be an alternating current type motor. Also, while the invention has been shown in two embodiments which are respectively single phase and two phase, it may be used to advantage with greater numbers of phases by the addition of relatively simple arrangements for converting three or more phases to two phase. For instance, such an arrangement for converting three phase power to two phase power is the well-known Scott transformer connection which is set forth in paragraph 145 of section 6 of the Standard Handbook for Electrical Enigneers, published by the McGraw-Hill Book Company, sixth edition, and which is illustrated in figure 30 on page 691 of that text. Further, it will be understood that while the embodiments have been shown with the transformer core and secondary coil arranged to have substantially the same outer diameter as the motor stator core, variations from this particular arrangement may be made without impairing the value of the invention.

In view of the foregoing, while the invention has been explained by describing particular embodiments thereof, it will be apparent that improvements and modifications may be made without departing from the scope of the invention as defined in the appended claims.

What I claim as new and desire to secure by Letters Patent of the United States is:

1. An electric motor having coaxial relatively rotatable core members, a toroidal transformer core member axially spaced from and substantially coaxial with said relatively rotatable members, primary and secondary coils wound on said toroidal core member, said primary coil being adapted to be connected to a source of alternating current, and a field winding positioned on one of said relatively rotatable core members and directly connected across at least a part of said secondary coil.

2. An electric motor having concentric relatively rotatable core members, a toroidal transformer core member axially spaced from and substantially coaxial with said relatively rotatable members, primary and secondary coils, said primary coil comprising a relatively high number of turns of conductive material wound around said transformer core member in flux-inducing relation thereto and adapted to be connected to a source of alternating current, said secondary coil comprising a relatively small number of turns of conductive material wound around said toroidal core member, and a field winding positioned on one of said relatively rotatable core members and directly connected across at least a part of said secondary coil.

3. An electric motor having concentric relatively rotatable core members, a toroidal transformer core member axially spaced from and substantially coaxial with said relatively rotatable members, primary and secondary coils, said primary coil comprising a relatively high number of turns of conductive material wound around said transformer core member in flux-inducing relation thereto and adapted to be connected across a source of alternating current, said secondary coil comprising a single turn of conductive material positioned over said primary coil around said core member whereby said core member is in voltage-inducing relation to said secondary coil, and a field winding positioned on one of said relatively rotatable members and directly connected across said secondary coil.

4. An electric motor having coaxial relatively rotatable core members, a toroidal transformer core member axially spaced from and substantially coaxial with said relatively rotatable members, primary and secondary coils, said primary coil comprising a relatively high number of turns of conductive material wound around said transformer core member in flux-inducing relation thereto and adapted to be connected across a source of alternating current, said secondary coil comprising a single turn of conductive material positioned over said primary coil around said core member whereby said core member is in voltage-inducing relation to said secondary coil, and a plurality of field windings positioned on one of said relatively rotatable members and respectively directly connected in parallel across said secondary coil.

5. An electric motor having an inner rotatable member and an outer stationary core member concentric therewith, a toroidal transformer core member axially spaced from and substantially coaxial with said inner and outer members, a primary coil comprising a relatively high number of turns of conductive material wound around said transformer core member in flux-inducing relation thereto and adapted to be connected across a source of alternating current, a secondary coil comprising a single turn of conductive material positioned over said primary coil around said core member whereby said core member is in voltage-inducing relation to said secondary coil, and a plurality of field windings positioned on said stationary member and respectively directly connected in parallel with each other across said secondary coil.

6. An electric motor having concentric relatively rotatable members, a toroidal transformer core member arranged axially adjacent and substantially coaxial with said relatively rotatable members, primary and secondary coils, said primary coil comprising a relatively high number of turns of conductive material wound around said transformer core member in flux-inducing relation thereto, said secondary coil comprising a single turn of conductive material positioned over said primary coil wound around said transformer core member whereby said core member is in voltage-inducing relation to said secondary coil, and a winding positioned on one of said relatively rotatable members and connected across at least a part of said secondary coil, said winding and said secondary coil being formed as an integral part of cast metal.

7. An electric motor having an inner rotatable member and an outer stationary member concentric therewith, a toroidal transformer core member arranged axially adjacent and substantially coaxial with said inner and outer members, a primary coil comprising a relatively high number of turns of conductive material wound around said transformer core member in flux-inducing relation thereto, a secondary coil comprising a single turn of conductive material positioned over said primary coil wound around said transformer core member whereby said core member is in voltage-inducing relation to said secondary coil, and a plurality of windings positioned on said outer member connected in parallel across said secondary coil, all of said windings and said secondary coil being formed as a single integral part of cast metal.

8. An electric motor having an inner rotatable member and an outer stationary member concentric therewith, bearing means for rotatably supporting said rotatable member, a toroidal transformer core member arranged axially adjacent and substantially coaxial with said inner and outer members, a primary coil comprising a relatively high number of turns of conductive material wound around said transformer core member in flux-inducing relation thereto, a secondary coil comprising a single turn positioned over said primary coil wound around said transformer core member whereby said core member is in voltage-inducing relation to said secondary coil, and a plurality of windings positioned on said outer member and connected in parallel with said other across said secondary coil, said windings, said secondary coil and said bearing means being formed as a single integral part of cast metal.

9. An electric motor having an inner rotatable member and an outer stationary member concentric therewith, a toroidal transformer core member arranged axially adjacent and substantially coaxial with said inner and outer members, a primary coil comprising a relatively high number of turns of conductive material wound around said transformer core member in flux-inducing relation thereto, a secondary coil comprising a single turn of conductive material positioned over said primary coil wound around said transformer core member whereby said core member is in voltage-inducing relation to said secondary coil, said outer member having a plurality of substantially axially extending slots extending therethrough, windings positioned in said slots respectively, said windings being connected in parallel and being alternately oppositely connected to said secondary coil thereby to cause alternate windings to have opposite polarities, said windings and said secondary coil all being formed as a single integral part of cast metal.

10. An electric motor having an inner rotatable member and an outer stationary member concentric therewith, a toroidal transformer core member arranged axially adjacent and substantially coaxial with said inner and outer members, a primary coil comprising a relatively high number of turns of conductive material wound around said transformer core member in flux-inducing relation thereto, a secondary coil comprising a single turn of conductive material positioned over said primary coil wound around said transformer core member whereby said core member is in voltage-inducing relation to said secondary coil, said stationary member having a plurality of pairs of substantially axially extending slots formed therein, the two slots of each pair being adjacent each other, one slot of each pair having a relatively large cross sectional area and the other slot of each pair having a relatively small cross sectional area, a plurality of windings respectively formed in said slots, said windings being connected together in parallel across said secondary coil, all said windings and said secondary coil being formed as a single integral part of cast metal.

11. An electric motor having an inner rotatable member and an outer stationary member concentric therewith, a toroidal transformer core member arranged axially adjacent and substantially coaxial with said inner and outer members, bearing means for supporting said inner member in rotatable relation to said outer member, a primary coil comprising a relatively high number of turns of conductive material wound around said transformer core member in flux-inducing relation thereto, a secondary coil comprising a single turn of conductive material positioned over said primary coil wound around said transformer core member whereby said core member is in voltage-inducing relation to said secondary coil, said stationary member having a plurality of substantially axially extending slots formed therein, a plurality of windings respectively positioned in said slots, an end ring type member connecting all said windings together at the end of said stationary member opposite to said transformer core member, said windings being connected in parallel across said secondary coil, said bearing means, said secondary coil, said windings, and said end ring type member being formed as a single integral part of cast metal.

12. An electric motor having an inner rotatable member and an outer stationary member concentric therewith, said stationary member having a plurality of slots formed therein, a plurality of substantially U-shaped members of conductive material each arranged in a pair of slots to form a pole, a toroidal transformer core member arranged axially adjacent and substantially coaxial with said inner and outer members, a primary coil comprising a relatively high number of turns of conductive material wound around said transformer core member in flux-inducing relation thereto, conductive means arranged about said transformer core over said primary coil, the ends of each of said U-shaped members being arranged in electrical engagement with said conductive means to form a single turn secondary coil about said transformer core member.

13. An electric motor having an inner rotatable member and an outer stationary member concentric therewith, said stator member having a plurality of slots formed therein, a plurality of substantially U-shaped members of conductive material each arranged in a pair of slots to form a pole, a toroidal transformer core member arranged axially adjacent and substantially coaxial with said inner and outer members, a primary coil comprising a relatively high number of turns of conductive material wound around said transformer core member in flux-inducing relation thereto, and an annular member comprising radially and axially extending parts arranged respectively over the axially and radially outer surfaces of said transformer core member, the ends of each of said U-shaped members being arranged respectively in electrical engagement with said radially and axially extending parts to form a single turn secondary coil.

14. An electric motor having an inner rotatable member and an outer stationary member concentric therewith, said outer member having a plurality of slots formed therein, each of said slots having a substantially wedge-shaped cross section with the smaller dimension thereof toward the bore of the outer member, a plurality of substantially U-shaped members of conductive material each arranged in a pair of slots to form a pole, each of said U-shaped members having a cross section substantially matching that of said slots whereby said U-shaped members are secured against radial movement when in said slots, a toroidal transformer core member arranged axially adjacent and substantially coaxial with said inner and outer members, a primary coil comprising a relatively high number of turns of conductive material wound around said transformer core member in flux-inducing relation thereto, an annular member comprising radially and axially extending parts arranged respectively over the axially and radially outer surfaces of said transformer core member, one end of each of said U-shaped members being bent upwardly into electrical engagement with said axially extending part and the other end of each of said U-shaped members extending axially outward into engagement with the radially extending part to form a single turn secondary coil.

15. A two phase electric motor having an inner rotatable member and an outer stationary member concentric therewith, said outer member having a plurality of slots formed around the bore thereof, two groups of oppositely axially positioned substantially U-shaped members of conductive material each arranged in a pair of slots separated by a single slot to form a pole, adjoining slots having therein U-shaped members of different groups, a pair of toroidal transformer core members respectively arranged axially adjacent and substantially coaxial with said inner and outer members at the ends thereof, a pair of primary coils each comprising a relatively high number of turns of conductive material respectively wound around said transformer core members in flux-inducing relation thereto, conductive means respectively arranged about said transformer core members over said primary coils, the ends of each of said U-shaped members of the first group being arranged in electrical engagement with said conductive means at one end of said inner and outer members to form a first single turn secondary coil, and the ends of each of said U-shaped members of the other group being arranged in electrical engagement with said conductive means at the other end of said inner and outer members to form a second single turn secondary coil.

16. A two-phase electric motor having an inner rotatable member and an outer stationary member concentric therewith, said outer member having a plurality of slots formed around the bore thereof, two groups of substantially U-shaped members of conductive material each arranged in a pair of slots separated by a single slot to form a pole, adjoining slots having therein U-shaped members of different groups, a pair of toroidal transformer core members arranged axially adjacent and substantially coaxial with said inner and outer members at the ends thereof, a pair of primary coils each comprising a relatively high number of turns of conductive material respectively wound around said transformer core members in flux-inducing relation thereto, a pair of annular members each comprising radially and axially extending parts respectively arranged over the axially and radially outer surfaces of said transformer core members, the end of each said U-shaped members of one group being arranged respectively in electrical engagement with said radially and axially extending parts of one said annular member to form a first single turn secondary coil, the ends of each of said U-shaped members of the second group being arranged respectively in electrical engagement with said radially and axially extending parts of said other annular member to form a second single turn secondary coil.

References Cited in the file of this patent

UNITED STATES PATENTS

| | | |
|---|---|---|
| 1,896,328 | Pohl | Feb. 7, 1933 |
| 1,920,318 | Pfleger | Aug. 1, 1933 |
| 1,931,789 | Dickey | Oct. 24, 1933 |
| 2,079,092 | Waters | May 4, 1937 |
| 2,716,196 | Anderson et al. | Aug. 23, 1955 |

FOREIGN PATENTS

| | | |
|---|---|---|
| 310,910 | Italy | Sept. 13, 1933 |